United States Patent
Freitag et al.

(10) Patent No.: US 10,088,221 B2
(45) Date of Patent: Oct. 2, 2018

(54) VACUUM INSULATION BODY

(71) Applicants: Liebherr-Hausgeräte Lienz GmbH, Lienz (AT); Liebherr-Hausgeräte Ochsenhausen GmbH, Ochsenhausen (DE)

(72) Inventors: Michael Freitag, Würzburg (DE); Martin Kerstner, Würzburg (DE); Jochen Hiemeyer, Karlstadt (DE)

(73) Assignees: Liebherr-Hausgeräte Lienz GmbH, Lienz (AT); Liebherr-Hausgeräte Ochsenhausen GmbH, Ochsenhausen (DE)

( * ) Notice: Subject to any disclaimer, the term of this patent is extended or adjusted under 35 U.S.C. 154(b) by 180 days.

(21) Appl. No.: 14/766,571

(22) PCT Filed: Jan. 21, 2014

(86) PCT No.: PCT/EP2014/000153
§ 371 (c)(1),
(2) Date: Aug. 7, 2015

(87) PCT Pub. No.: WO2014/121893
PCT Pub. Date: Aug. 14, 2014

(65) Prior Publication Data
US 2015/0377546 A1    Dec. 31, 2015

(30) Foreign Application Priority Data

Feb. 7, 2013    (DE) .................. 10 2013 005 585

(51) Int. Cl.
*F25D 23/06*    (2006.01)
*B32B 37/10*    (2006.01)

(52) U.S. Cl.
CPC ........ *F25D 23/065* (2013.01); *B32B 37/1018* (2013.01); *B32B 2307/304* (2013.01); *F25D 23/061* (2013.01); *F25D 2201/14* (2013.01)

(58) Field of Classification Search
CPC ..................................................... F25D 23/065
USPC ........................................................... 428/69
See application file for complete search history.

(56) References Cited

U.S. PATENT DOCUMENTS

| | | | |
|---|---|---|---|
| 2004/0058119 A1 | 3/2004 | Wynne | |
| 2005/0053755 A1* | 3/2005 | Markey | B32B 3/18 428/69 |
| 2006/0263585 A1* | 11/2006 | Yuasa | F16L 59/065 428/292.1 |
| 2009/0179541 A1* | 7/2009 | Smith | B29C 63/02 312/406 |

FOREIGN PATENT DOCUMENTS

| | | |
|---|---|---|
| DE | 198 03 908 A1 | 8/1999 |
| DE | 100 15 876 A1 | 10/2001 |
| DE | 10 2004 011 614 A1 | 2/2005 |
| DE | 20 2006 013 562 U1 | 11/2007 |

(Continued)

*Primary Examiner* — Brent T O'Hern
(74) *Attorney, Agent, or Firm* — Dilworth & Barrese, LLP

(57) ABSTRACT

The present invention relates to a vacuum insulation body, comprising at least one envelope body and at least one diffusion-tight envelope which at least partly adjoins the envelope body, wherein the envelope at least partly is present as prefabricated bag or partial bag which in its geometry is completely or largely adapted to the shape of the envelope body.

13 Claims, 1 Drawing Sheet

(56) References Cited

FOREIGN PATENT DOCUMENTS

DE     10 2009 002 800 A1     11/2010
EP     2472164 A1     7/2012
JP     H08-312880 A     11/1996

\* cited by examiner

VACUUM INSULATION BODY

BACKGROUND OF THE INVENTION

The present invention relates to a vacuum insulation body comprising at least one envelope body and at least one diffusion-tight envelope, which at least partly adjoins the envelope body.

The principle of vacuum heat insulation has long since been known from the prior art.

To manufacture a heat-insulated container, such as a refrigerator or freezer which should be designed according to the principle of vacuum heat insulation, it is required to produce a vacuum-tight envelope. Since a self-supporting envelope usually is hard to realize, unless the containers are rotationally symmetrical, a filling material usually is employed, which provides the vacuum insulation body with the corresponding dimensional stability and prevents that the walls of the vacuum insulation body directly rest against each other after the generation of a vacuum. This filling material for example can be a bulk material.

When a porous filling material is used, the requirement on the vacuum is reduced, as the pore size of the filling material has an influence on the remaining heat conduction of gas. The smaller the pores of the filling material, the smaller the requirements on the applied vacuum, in order to suppress the undesired effect of the heat conduction of gas.

To provide a long enough useful life for such vacuum-insulated containers, the envelope surrounding the evacuated region must be vacuum-tight to a high extent. In dependence on the kind of filling material, different demands on the exact maximum tolerable leakage rate are obtained, but in all cases it must be ensured that there is a high vacuum tightness.

From the prior art it furthermore is known, for example, to use a high-barrier film, in order to produce a diffusion-tight envelope which hence is suitable as boundary of an evacuated region.

In use of such envelopes, however, there is the problem of how the same can be arranged as easily and reliably as possible relative to the corresponding adjoining wall, in order to ultimately manufacture a vacuum insulation body.

When the envelope is damaged for example on attachment of the envelope to the corresponding envelope body or to a wall, the useful life of the vacuum insulation body correspondingly is limited and its usability is not given from the outset.

SUMMARY OF THE INVENTION

Therefore, it is the object underlying the present invention to develop a vacuum insulation body as mentioned above to the effect that the same has a long useful life.

This object is solved by a vacuum insulation body with the features herein. Accordingly, it is provided that the envelope is present as prefabricated bag or partial bag, which in its geometry is completely or largely adapted to the shape of the envelope body. According to the invention, it thus is provided that in a first method step said bag or partial bag is fabricated, namely such that its geometry is completely or largely adapted to the shape of the envelope body.

It is conceivable, for example, that the shaping envelope body is an inner container of a refrigerator and/or freezer. In this case, the envelope is manufactured such that in its geometry it is largely adapted or corresponds to the shape of the inner container and preferably is designed such that it can be put over the same.

It is conceivable, for example, that the inner container or the outer housing is not designed as a simple box-shaped structure, but possibly includes one or more protrusions or indentations, such as the compressor niche. In this case, the envelope is designed correspondingly, i.e. likewise with such step-like shoulder, so that a rather good modeling of the contour of the envelope body is achieved. While in a first method step the bag or partial bag thus is prefabricated, for example of a flat material or film which then is welded or glued together at its edges, this envelope subsequently is positioned relative to the envelope body in a second method step, such as for example by putting the same over or inserting the same, depending on whether the envelope is to be mounted on the outside or inside of the envelope body in question.

Due to the inventive design of the vacuum insulation body, tensions in the envelope largely or completely are avoided, so that a risk of damage of the envelope is reduced correspondingly and the vacuum insulation body has a correspondingly long useful life.

The envelope can be designed as bag or partial bag, by which it is meant that the envelope represents a structure open on one side only or also a structure open on more than one side.

In a preferred aspect of the invention it is provided that the surface of the envelope is larger than the surface of the envelope body or the envelope body portion, relative to which the envelope is positioned, or that before attachment to the envelope body the volume of the envelope is greater than the volume of the envelope body, so that the envelope can be put or drawn over the envelope body.

In this exemplary embodiment, the dimensions of the envelope thus are at least slightly larger than the corresponding dimensions of the envelope body, so that putting over is possible.

Such design not only simplifies that attachment of the envelope to the envelope body, but also takes into account that there can be irregularities on the envelope body, for example in the form of the evaporator of a refrigerator or freezer, which likewise must be enclosed by the envelope. When the envelope correspondingly is designed larger than the envelope body, it is no problem to also enclose these components or irregularities of the envelope body with the envelope.

Preferably, the envelope thus consists of an extra-large film bag of vacuum-tight film.

In another aspect of the invention it is provided that the envelope body includes one or more protruding or set-back contours, so that the envelope largely or completely models these contours.

In this case, the envelope thus rests against the envelope body largely following the contours. Such attachment for example can be achieved in that between the envelope and the envelope body a vacuum or negative pressure is applied. For example, when an evaporator or other lines or components is/are present on the outside of the envelope body, the envelope largely or completely models these components, i.e. largely or completely rests against the same.

Furthermore, it can be provided that the envelope partly or completely is designed as high-barrier film.

The envelope can be glued or welded to the envelope body in large parts.

It can surround the envelope body on its outside or on its inside or be inserted into the same.

In its main surfaces it can consist of an aluminum composite film and in the transition regions of the main surfaces include a metallized high-barrier film which is vacuum-tightly connected with the aluminum composite film of the main surfaces.

It thus is conceivable, for example in the case of a box-like inner container, to manufacture the flat portions of said aluminum composite film and the transition portions in the edge regions of a metallized high-barrier film which is vacuum-tightly connected with the aluminum composite film.

The manufacture of the envelope can be carried out on a mold which in its shape resembles or corresponds to the shape of the envelope body.

This connection of the two films for example can be effected by gluing or welding.

The present invention furthermore relates to a refrigerator and/or freezer with at least one cooled interior space and with at least one wall at least partly surrounding the cooled interior space, wherein the wall partly or completely is formed by at least one vacuum insulation body according to the invention.

The envelope body mentioned above for example can be the inner container of the appliance, which on its side facing away from the cooled interior space is provided with the envelope according to the invention.

In principle, the envelope body also can be the outer housing of a refrigerator and/or freezer, whose inside facing away from the outside can be provided with the envelope according to the invention. The "envelope" thus can also be designed as insert.

It furthermore is conceivable that the wall of the refrigerator and/or freezer thus on the one hand comprises the inner container and on the other hand the outer wall of the housing, wherein it preferably is provided that between these two walls a vacuum exists and preferably no foam insulation is provided for the purpose of heat insulation, as is the case in known refrigerators and/or freezers.

It furthermore is conceivable that in the evacuated region between the inner container and the outer wall a bulk material e.g. of a silicon oxide compound and/or pearlite is present.

The envelope partly or completely can be glued to the corresponding envelope body, i.e. for example to the inner container or also to the outer container or the outer walls. It is conceivable to not glue or connect certain regions of the envelope to the envelope body, in order to provide for certain flexibility when positioning the envelope.

The present invention furthermore relates to a method for manufacturing a vacuum insulation body according to any of claims 1 to 5, wherein at least one diffusion-tight envelope is arranged on at least one shaping envelope body, wherein the envelope is present as prefabricated bag or partial bag which in its geometry is completely or largely adapted to the shape of the envelope body.

It is conceivable to provide a method step in which the prefabricated envelope is put over the envelope body or inserted into the same and possibly partly or completely connected with the respective envelope body.

To achieve that the envelope rests against the envelope body as completely as possible, it can be provided that between the envelope and the envelope body a negative pressure is applied, so that the envelope attaches to the surface of the envelope body.

This method step leads to the fact that the envelope partly or completely models the contours of the envelope body, such as for example of the inner container.

It is conceivable to produce such attachment by negative pressure at a stage in which the inner container provided with the envelope is inserted into the outer container for example laminated with a diffusion-tight film on the inside.

It is conceivable that after such insertion the space between inner container and outer wall or the respective envelopes is filled with a bulk material, for example with a pearlite powder, and that then the diffusion-tight films both of the inner container and of the outer body are vacuum-tightly connected with each other, so that subsequently vacuum can be applied in the region of the bulk material.

Sealing of the respective envelopes or of the envelope of the inner container and of the film or envelope of the outer container can be effected thermally.

It furthermore is conceivable to turn the arrangement upside down after filling for the purpose of the uniform distribution of the bulk material and by vibrations and an alternation of negative pressure and positive pressure or ventilation bring the powder into shape, so that neither the inner container nor the outer container or the outer wall have bulges or undesired contours.

When the powder has its desired shape or desired distribution, the evacuation of the region between inner container and outer wall can be performed, i.e. the desired shape is fixed by applying negative pressure.

BRIEF DESCRIPTION OF THE DRAWINGS

Further details and advantages of the invention will be explained in detail with reference to an exemplary embodiment illustrated in the drawing, in which.

DESCRIPTION OF THE PREFERRED EMBODIMENTS

Figure 4:
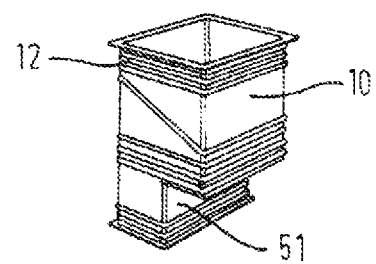
FIG. 4 shows an inner container with reference numeral 10, which for example can be made of plastics or metal and which on its outside has an evaporator coil 12 in the form of one or more tubes and in its lower region includes a step-like indentation 51.

To sheathe this inner container with a film or high-barrier film, a film bag is made from a film bag or from a rolled material, such as e.g. aluminum composite film with a metallized film welded thereto, the contour of said film bag corresponding to the contour of the inner container 10 as shown in FIG. 4. This means that in the exemplary embodiment shown here the prefabricated film bag consists of a box-shaped region which in its lower region includes a step-like indentation 52. The film bag thus represents a copy of the inner container, wherein its inside dimension is greater than the outside dimension of the inner container, so that the same can be put over the inner container.

Figure 1:
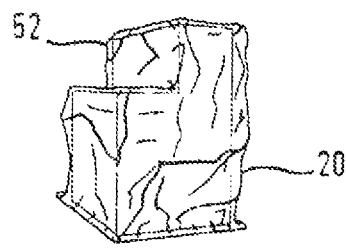
FIG. 1: shows a representation of a film bag of high-barrier film, which is put over the inner container.

FIG. 1 shows the state in which the film bag of aluminum composite film or high-barrier film 20 is put over the inner container 10.

Figure 2:
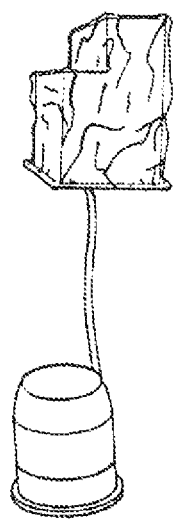
FIG. 2: shows the arrangement according to FIG. 1 after sucking the envelope to the inner container.

To achieve that the film bag rests against the outside of the inner container, the film bag is sucked in and thus attaches to the surface of the inner container. This state is illustrated in FIGS. 2 and 3.

In this state fixed by negative pressure, the inner container correspondingly put over can be inserted into an outer contour or into an outer container. On its side facing the inner container, this outer container likewise includes a high-barrier film, so that the high-barrier film as such on the one hand is formed by the envelope 20 according to FIG. 2 and on the other hand by the high-barrier film which forms the inner lining of the outer container. After inserting and filling in bulk material, such as for example pearlite powder, these two envelopes are welded to each other in a vacuum-tight manner, so that the region of the bulk material can be evacuated.

Figure 3:
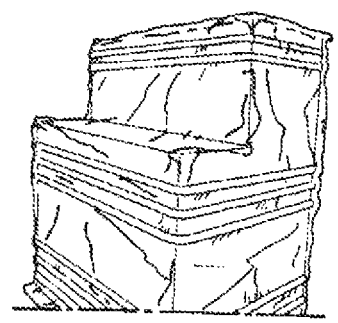
FIG. 3: shows a detail representation of the arrangement according to FIG. 2, and FIG. 4: shows a perspective representation of an inner container designed with evaporator.

FIG. 3 shows a detail representation of the inner container covered with the envelope and illustrates that for example the evaporator contours, which can be seen in FIG. 4, are modeled in the envelope.

The invention claimed is:

1. A refrigerator and/or freezer comprising a cooled interior space and a wall completely surrounding the cooled interior space, wherein the wall completely is formed by at least one vacuum insulation body comprising
an inner container (10), and
an integral diffusion-tight envelope (20) formed as a single prefabricated bag having inner dimensions substantially corresponding to dimensions of an outer contour of the inner container (10) surrounding the cooled interior space, and
the envelope (20) directly adhering to the inner container (10) surrounding the cooled interior space by a vacuum generated between the inner container (10) and envelope (20) during manufacture of the refrigerator and/or freezer.

2. The refrigerator and/or freezer according to claim 1, comprising an envelope body including the wall and which at least partly adjoins the diffusion-tight envelope, wherein
the envelope completely or largely conforms to a shape of the envelope body, and
the envelope body surrounds the cooled interior space and is provided with the envelope on a side facing away from the cooled interior space or on a side facing away from outside.

3. The refrigerator and/or freezer according to claim 2, wherein a surface area of the envelope is greater than a surface area of the envelope body or an envelope body portion against which the envelope rests.

4. The refrigerator and/or freezer according to claim 2, wherein the envelope body includes one or more protruding or set-back contours and the envelope largely or completely models these contours.

5. The refrigerator and/or freezer according to claim 2, wherein the envelope partly or completely is formed as high-barrier film.

6. The refrigerator and/or freezer according to claim 1, additionally comprising an outer wall, wherein between the envelope directly-adhering to the inner wall and the outer wall, no foam insulation is present for the purpose of heat insulation.

7. The refrigerator and/or freezer according to claim 6, wherein between the envelope and the outer wall, a bulk material is present.

8. The refrigerator and/or freezer according to claim 7, wherein the bulk material is a silicon oxide compound and/or pearlite.

9. The refrigerator and/or freezer according to claim 1, wherein the wall comprises an indentation and the envelope substantially corresponds to the outer contour of the wall including said indentation.

10. A refrigerator and/or freezer comprising a cooled, interior space and a wall at least partly surrounding the cooled interior space, wherein the wall partly or completely is formed by at least one vacuum insulation body comprising
a diffusion-tight envelope formed as a prefabricated bag substantially corresponding to an outer contour of the wall surrounding the cooled interior space,
the envelope directly adhering to the wall surrounding the cooled interior space by a vacuum generated between the wall and envelope during manufacture of the refrigerator and/or freezer, and
an envelope body including the wall and which at least partly adjoins the diffusion-tight envelope, wherein
the envelope completely or largely conforms to a shape of the envelope body,
the envelope body surrounds the cooled interior space and is provided with the envelope on a side facing away from the cooled interior space or on a side facing away from outside,
the envelope is composed of an aluminum composite film in its main surfaces, and
in transition regions of main surfaces thereof, a metallized high-barrier film is present, which is connected with the aluminum composite film in a vacuum-tight manner.

11. A refrigerator and/or freezer comprising a cooled interior space and a wall at least partly surrounding the cooled interior space, wherein the wall partly or completely is formed by at least one vacuum insulation body comprising
a diffusion-tight envelope formed as a prefabricated bag substantially responding to an outer contour of the wall surrounding the cooled interior space, and
the envelope directly adhering to the wall surrounding the cooled interior space by a vacuum generated between the wall and envelope during manufacture of the refrigerator and/or freezer,
wherein the wall comprises an indentation and the envelope substantially corresponds to the outer contour of the wall including said indentation,
additionally including a coil wrapped around an outer surface of the wall, wherein the envelope substantially corresponds to the outer contour of the wall including said coil.

12. A method for manufacturing the refrigerator and/or freezer according to claim 2, wherein
the diffusion-tight envelope is attached to the envelope body, the envelope being present as a prefabricated bag or partial bag which completely or largely conforms to the shape of the envelope body, and
the envelope body is not present within an evacuated region of the vacuum insulation body.

13. The method according to claim 8, wherein after attachment of the envelope, a negative pressure is applied between the envelope and the envelope body.

* * * * *